United States Patent
Torii et al.

(10) Patent No.: US 6,628,026 B2
(45) Date of Patent: Sep. 30, 2003

(54) GEARED MOTOR INCLUDING RIBBED GEAR HOUSING

(75) Inventors: Katsuhiko Torii, Hamamatsu (JP); Hiroaki Yamamoto, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/816,070

(22) Filed: Mar. 26, 2001

(65) Prior Publication Data

US 2001/0026105 A1 Oct. 4, 2001

(30) Foreign Application Priority Data

Mar. 30, 2000 (JP) ........................................ 2000-093770

(51) Int. Cl.[7] ................................................. H02K 5/00
(52) U.S. Cl. ....................... 310/89; 310/75 R; 74/606 R
(58) Field of Search ................................ 310/75 R, 83, 310/89, 85, 88, 67 R; 74/606 R, 612

(56) References Cited

U.S. PATENT DOCUMENTS

| | | | | |
|---|---|---|---|---|
| 4,226,136 A | * | 10/1980 | Porter et al. ................... | 74/416 |
| 5,418,412 A | * | 5/1995 | Brucker ...................... | 310/119 |
| 6,014,915 A | * | 1/2000 | Evans ....................... | 74/606 R |
| 6,051,899 A | * | 4/2000 | Walther et al. ................ | 310/71 |
| 6,122,996 A | * | 9/2000 | Hauser et al. ................. | 24/545 |

FOREIGN PATENT DOCUMENTS

| JP | U-60-177651 | 11/1985 |
|---|---|---|
| JP | U-2-53251 | 4/1990 |
| JP | A-5-276708 | 10/1993 |
| JP | A-7-298549 | 11/1995 |
| JP | A-8-336856 | 12/1996 |
| JP | WO 99/47779 | 9/1999 |

* cited by examiner

*Primary Examiner*—Dang Le
(74) *Attorney, Agent, or Firm*—Posz & Bethards, PLC

(57) ABSTRACT

A geared motor includes a yoke and a gear housing. The gear housing includes a worm housing segment and a wheel housing segment. A shaft supporting portion is formed for supporting an output shaft at a center of a base wall of the wheel housing segment. Ribs extend radially outwardly from the shaft supporting portion along an outer surface of the base wall of the wheel housing segment. A lateral thickness of each rib is equal to or smaller than an axial thickness of the base wall of the wheel housing segment.

17 Claims, 4 Drawing Sheets

GEARED MOTOR INCLUDING RIBBED GEAR HOUSING

CROSS REFERENCE TO RELATED APPLICATION

This application is based on and incorporates herein by reference Japanese Patent Application No. 2000-93770 filed on Mar. 30, 2000.

BACKGROUND OF THE INVENTION

1. Field of the Invention

The present invention relates to a geared motor that outputs a rotational force generated by a motor unit thereof through a worm gear assembly.

2. Description of Related Art

A geared motor has been used, for example, in a power window system of a vehicle. The geared motor generally includes a motor unit and a gear system connected to the motor unit. In a case of the power window system, a worm gear assembly is used as the gear system.

As shown in FIG. 7, one previously proposed geared motor 51 includes a cup-shaped yoke 52 that has a base wall at one end and an opening at the other end. The geared motor 51 further includes a gear housing 53 that covers the opening of the yoke 52. The yoke 52 receives a motor unit including a rotor, magnets, brushes and the like. The gear housing 53 receives a worm gear assembly including a worm, a worm wheel and the like. The gear housing 53 has a wheel housing segment 54 in which the worm wheel is received. An output shaft 55 is received and rotatably supported within a circular through hole that penetrates through a center of a shaft supporting portion arranged at a center of the wheel housing segment 54.

In the above geared motor 51, a rotational force of the motor unit is transmitted to the output shaft 55 via the worm gear assembly to output the rotational force from the geared motor. Then, the rotational force of the output shaft is transmitted to the power window system to drive the same.

The gear housing 53 is molded from a resin material. During a molding process of the gear housing 53, the wheel housing segment 54 may be warped when the resin material is cooled and solidified. Warping of the resin material of the wheel housing segment 54 causes the circular cross section of the through hole of the shaft supporting portion to be deformed into an ellipsoidal shape. The ellipsoidal through hole of shaft supporting portion causes an increase in a frictional resistance between the shaft supporting portion of the wheel housing segment 54 and the output shaft 55, so that the output shaft 55 cannot be freely rotated.

SUMMARY OF THE INVENTION

The present invention addresses the above described disadvantage. Therefore, it is an objective of the present invention to provide a geared motor that restrains warping of a gear housing during a molding process of the gear housing.

To achieve the objective of the present invention, there is provided a geared motor including a yoke and a gear housing. The yoke has an opening and receives a motor unit. The gear housing is made of a resin material. The gear housing covers the opening of the yoke and receives a worm gear assembly for transmitting a rotational force of the motor unit to an output shaft connected to the worm gear assembly. The worm gear assembly includes a worm wheel. The gear housing has a wheel housing segment that receives and rotatably supports the worm wheel. The wheel housing segment has a base wall. The output shaft is connected to the worm wheel and is rotatably received in the base wall of the wheel housing segment such that an axial direction of the output shaft is generally perpendicular to a plane of the base wall of the wheel housing segment. The geared motor further includes a plurality of ribs extending over at least part of an outer surface of the base wall of the wheel housing segment. Each one of the ribs has a lateral thickness that is measured in a direction perpendicular to the axial direction of the output shaft and that is equal to or smaller than an axial thickness of the base wall of the wheel housing segment measured in the axial direction of the output shaft.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A geared motor according to an embodiment of the present invention will be described with reference to the accompanying drawings. The geared motor according to the embodiment is used, for example, as an actuator of a power window system of a vehicle.

Figure 1:
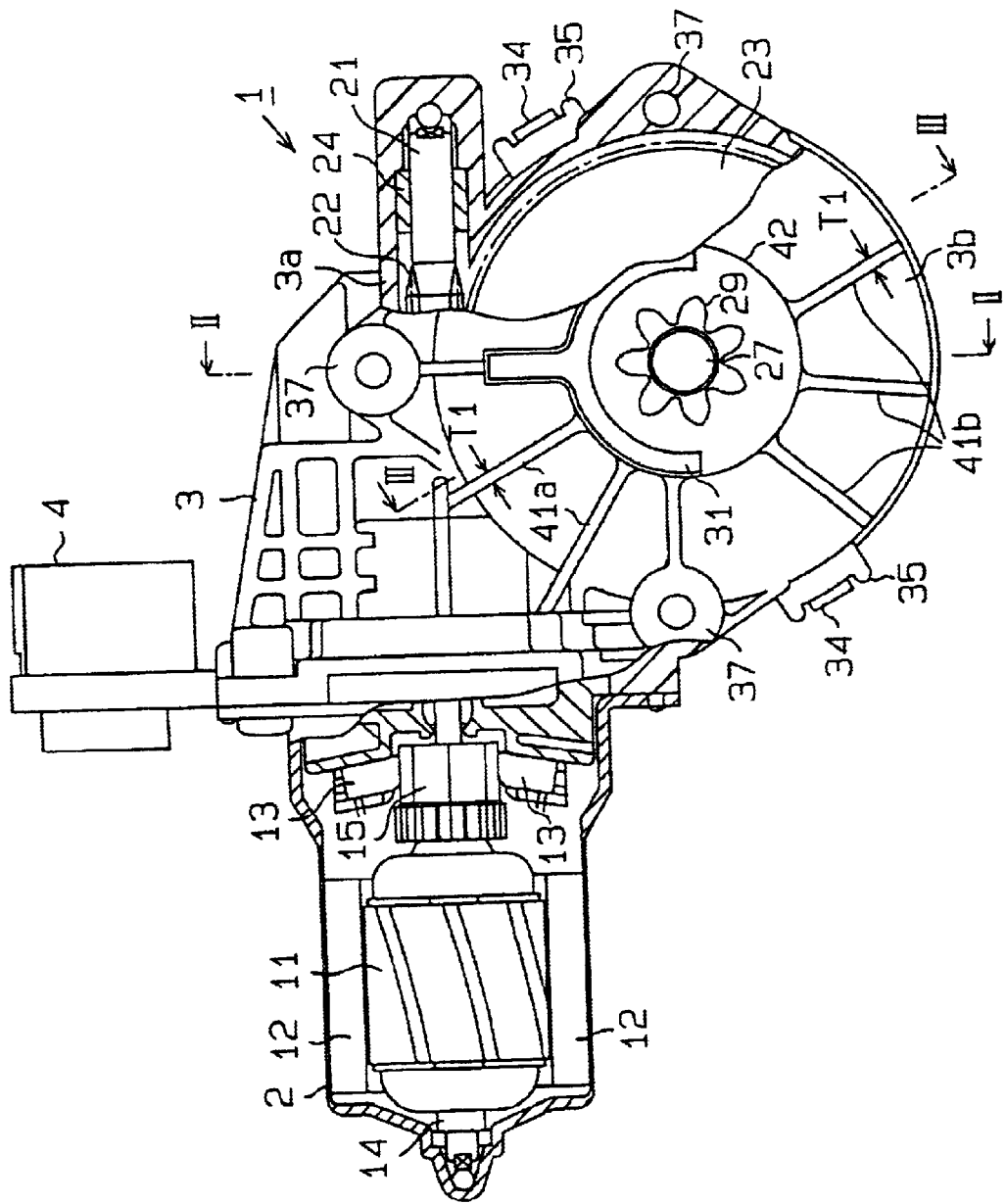
FIG. 1 is a schematic partial cut-away view of a geared motor according to an embodiment of the present invention.

As shown in FIG. 1, the geared motor 1 according to the present embodiment includes a cup-shaped yoke 2, a gear housing 3 and a power supply arrangement 4. The yoke 2 has an opening at one end (right side in FIG. 1) and a base wall at the other end (left side in FIG. 1). The gear housing 3 is made, for example, of a thermoplastic resin material, such as polybutylene terephthalate (PBT), and covers the opening of the yoke 2. The power supply arrangement 4 is received between the yoke 2 and the gear housing 3.

The yoke 2 receives a motor unit including a rotor 11, magnets 12 and brushes 13. More particularly, two magnets 12 are secured to an inner peripheral surface of the yoke 2 such that the two magnets 12 are diametrically opposed to one another about the rotor 11. A rotatable shaft 14 extends from the rotor 11 along a rotational axis of the rotor 11. The opposing ends of the rotatable shaft 14 are rotatably supported. A commutator 15 is secured to the rotatable shaft 14 on the gear housing 3 side thereof. Furthermore, the power supply arrangement 4 has a pair of opposing brushes 13 that slide along the commutator 15.

When electric current is supplied to the power supply arrangement 4 from an external power source (not shown), the electric current is conducted to a coil wound around the rotor 11 through the brushes 13 and the commutator 15, so that the rotor 11 rotates together with the rotatable shaft 14.

The gear housing 3 receives a worm gear assembly that includes a worm shaft 21 and a worm wheel 23. The worm shaft 21 includes a worm 22 that is meshed with the worm wheel 23.

Figure 2:
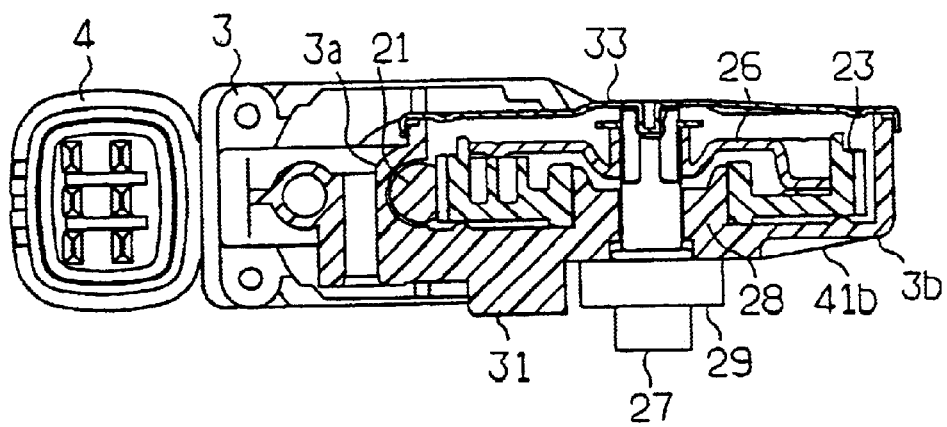
FIG. 2 is a cross-sectional view along line II—II in FIG. 1.
Figure 3:
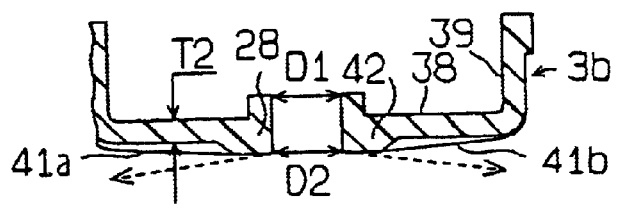
FIG. 3 is a cross-sectional view along line III—III in FIG. 1.

More particularly, the worm shaft 21 is received in a worm housing segment 3a of the gear housing 3 and is connected to the rotatable shaft 14 via a clutch (not shown). The worm shaft 21 is rotatably supported by a bearing 24 within the worm housing segment 3a. The worm wheel 23 is received in a wheel housing segment 3b of the gear housing 3. As shown in FIGS. 1 to 3, the wheel housing segment 3b is cup-shaped and has an opening at one end and a base wall 38 at the other end. The wheel housing segment 3b further includes a peripheral wall 39 that extends from an outer peripheral edge of the base wall 38 to the opening of the wheel housing segment 3b in an axial direction.

As shown in FIG. 2, the wheel housing segment 3b receives an output plate 26 along with the worm wheel 23. The output plate 26 is rotated integrally with the worm wheel 23 via a rubber damper (not shown) placed therebetween. An output shaft 27 is securely connected to a center of the output plate 26 at one end. The output shaft 27 is received and freely rotatably supported within a through hole penetrating through a shaft supporting portion 28 formed at a center of the wheel housing segment 3b. The through hole of the shaft supporting portion 28 is a substantially circular through hole having an inner diameter generally corresponding to an outer diameter of the output shaft 27. A gear 29 for transmitting a driving force to an external device is formed around a portion of the output shaft 27 which protrudes out from the shaft supporting portion 28 of the wheel housing segment 3b. When the rotation of the motor unit is transmitted to the worm wheel 23 via the worm shaft 21 to rotate the worm wheel 23, the rotation of the worm wheel 23 is transmitted to the output shaft 27 via the rubber damper (not shown) and the output plate 26. Then, the rotation of the output shaft 27 is transmitted to the external device via the gear 29. As shown in FIG. 1, a guard 31 is provided on an outer surface of the base wall 38 of the wheel housing segment 3b to surround one half of the gear 29.

As shown in FIG. 2, in assembling of the geared motor 1, while the worm wheel 23 and the output plate 26 are received in the wheel housing segment 3b, the output shaft 27 is inserted into the shaft supporting portion 28 and is securely connected to the output plate 26. Then, a cover 33 is secured to the opening of the wheel housing segment 3b. More specifically, as shown in FIG. 1, two engaging claws 34 of the cover 33 are engaged with engaging portions 35 that are formed in an outer peripheral surface of the peripheral wall 39 of the wheel housing segment 3b. Furthermore, there are provided three securing portions 37 for securing the geared motor 1 to, for example, a vehicle door.

A plurality of ribs 41a and 41b are formed in the gear housing 3. The ribs 41a and 41b extend radially outwardly from the shaft supporting portion 28 (output shaft 27) along the outer surface of the base wall 38 of the wheel housing segment 3b. More particularly, as shown in FIGS. 1 and 3, a thick wall portion 42 is formed around the shaft supporting portion 28. The ribs 41a and 41b extend radially outwardly from an outer peripheral edge of the thick wall portion 42 to an outer peripheral edge of the base wall 38 of the wheel housing segment 3b. Among the ribs 41a and 41b, the ribs 41a extend over at least part of an outer surface of a base wall of the worm housing segment 3a. More specifically, at least two of the ribs 41a extend substantially to an imaginary plane, which extends through a rotational axis of the worm 22 and is parallel to a rotational axis of the worm wheel 23. As shown in FIG. 1, a lateral thickness T1 of each rib 41a or 41b measured in a direction perpendicular to an axial direction of the output shaft 27 is equal to or smaller than an axial thickness T2 (FIG. 3) of the base wall 38 of the wheel housing segment 3b measured in the axial direction of the output shaft 27. Also, as shown in FIG. 3, each rib 41a or 41b is formed such that an axial thickness of each rib 41a or 41b that is measured in the axial direction of the output shaft 27 decreases toward the outer peripheral edge of the base wall 38 of the wheel housing segment 3b.

Details of construction and operation of the ribs 41a and 41b will be described below.

As described above, the gear housing 3 is molded from the resin material. During the molding process of the gear housing 3, the resin material shrinks in the cooling and solidifying step. A degree of shrinkage of a thicker resin portion is larger than a degree of shrinkage of a thinner resin portion. As shown in FIG. 3, because of a difference in the shrinkages, the resin material of the wheel housing segment 3b tends to warp in directions indicated by dashed arrows. That is, the wheel housing segment 3b experiences the warpage in the planar base wall portion thereof that extends in a direction perpendicular to the axial direction of the output shaft 27, so that the opening of the wheel housing segment 3b is deformed in a radially outward direction. However, in accordance with the present embodiment, each rib 41a or 41b is formed such that the lateral thickness T1 of the rib 41a or 41b is equal to or smaller than the axial thickness T2 of the base wall 38 of the wheel housing segment 3b. As a result, the ribs 41a and 41b solidify faster than the base wall 38 of the wheel housing segment 3b without experiencing the substantial warpage. Furthermore, even if the lateral thickness T1 of each rib 41a or 41b is substantially equal to the axial thickness T2 of the base wall 38 of the wheel housing segment 3b, the rib 41a or 41b still solidifies faster than the base wall 38 of the wheel housing segment 3b. This is due to the fact that the ribs 41a and 41b are protruded from the base wall 38 of the wheel housing segment 3b in the axial direction, allowing faster cooling of the ribs 41a and 41b in comparison to the base wall 38 of the wheel housing segment 3b. As a result, the solidified ribs 41a and 41b can resist warping of the base wall 38 of the wheel housing segment 3b while the base wall 38 is not completely solidified. Furthermore, the ribs 41a extend over at least part of an outer surface of the base wall of the worm housing 3a, so that the worm housing segment 3a and the wheel housing segment 3b are directly connected by the ribs 41a. This connection allows more reliable restraint of warping of the wheel housing segment 3b.

Because of the restraint of warping of the wheel housing segment 3b, the deformation of the opening of the wheel housing segment 3b in the radially outward direction is advantageously restrained. As a result, in manufacturing, there is achieved a higher precision of a sealing surface of the wheel housing segment 3b which is to be engaged with the cover 33, improving a sealing performance of the cover 33 and therefore improving yields.

Furthermore, the warpage of the wheel housing segment 3b also causes a decrease in the circularity of the through hole of the shaft supporting portion 28 that supports the output shaft 27. That is, as shown in FIG. 3, an inner diameter D2 of the exterior-side opening of the through hole of the shaft supporting portion 28 becomes shorter than an inner diameter D1 of the interior-side opening of the through hole of the shaft supporting portion 28. As a result, the interior-side opening of the through hole of the shaft supporting portion 28 is deformed to an ellipsoidal shape. This results in an increase in the frictional resistance of the shaft supporting portion 28. Therefore, the output shaft 27 can not be freely rotatably supported within the through hole of the shaft supporting portion 28. However, according to the present embodiment, warping of the wheel housing segment 3b is advantageously restrained by the ribs 41a and 41b to avoid such a disadvantage.

The advantages of the above embodiment are summarized as follows.

(1) In the base wall 38 of the wheel housing segment 3b, there are provided the ribs 41a and 41b having the lateral thickness T1 that is equal to or smaller than the axial thickness T2 of the base wall 38 of the wheel housing segment 3b. With this construction, in the molding process of the gear housing 3, when the resin material of the wheel housing segment 3b is cooled and solidified, the ribs 41a and 41b solidify faster than the base wall 38 of the wheel housing segment 3b. Thus, the solidified ribs 41a and 41b restrain warping of the wheel housing segment 3b. As a result, the precision of the sealing surface of the wheel housing segment 3b which engages the cover 33 is improved, improving the sealing performance of the cover 33.

(2) Warping of the wheel housing segment 3b causes the through hole of the shaft supporting portion 28 to be deformed into the ellipsoidal shape. However, in accordance with the present embodiment, the ribs 41a and 41b extend radially outwardly from the shaft supporting portion 28 along the outer surface of the base wall 38 of the wheel housing segment 3b. As a result, the circularity of the through hole of the shaft supporting portion 28 is substantially maintained, allowing free rotation of the output shaft 27 within the through hole of the shaft supporting portion 28.

(3) The ribs 41a extend over at least part of the outer surface of the base wall of the worm housing 3a, so that the worm housing segment 3a and the wheel housing segment 3b are directly connected by the ribs 41a. Thus, warping of the wheel housing segment 3b can be more reliably restrained.

The above embodiment can be modified as follows.

Figure 4:
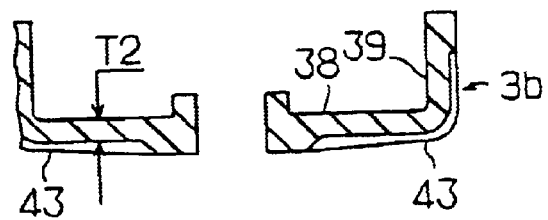
FIG. 4 is a cross-sectional view showing a modification of FIG. 3.
Figure 6:
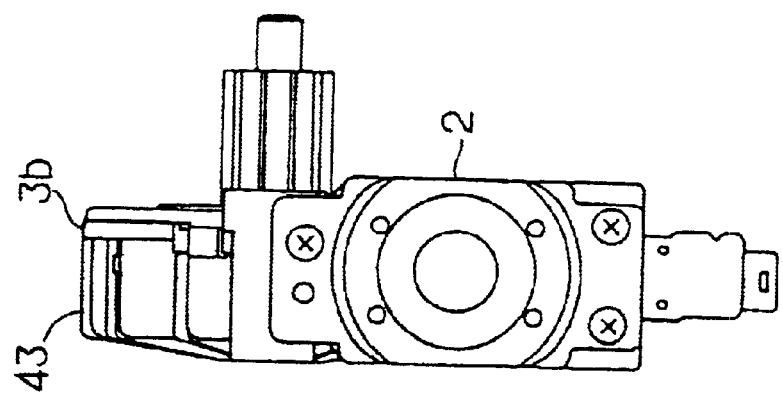
FIG. 6 is an end view of the geared motor shown in FIG. 5.
Figure 5:
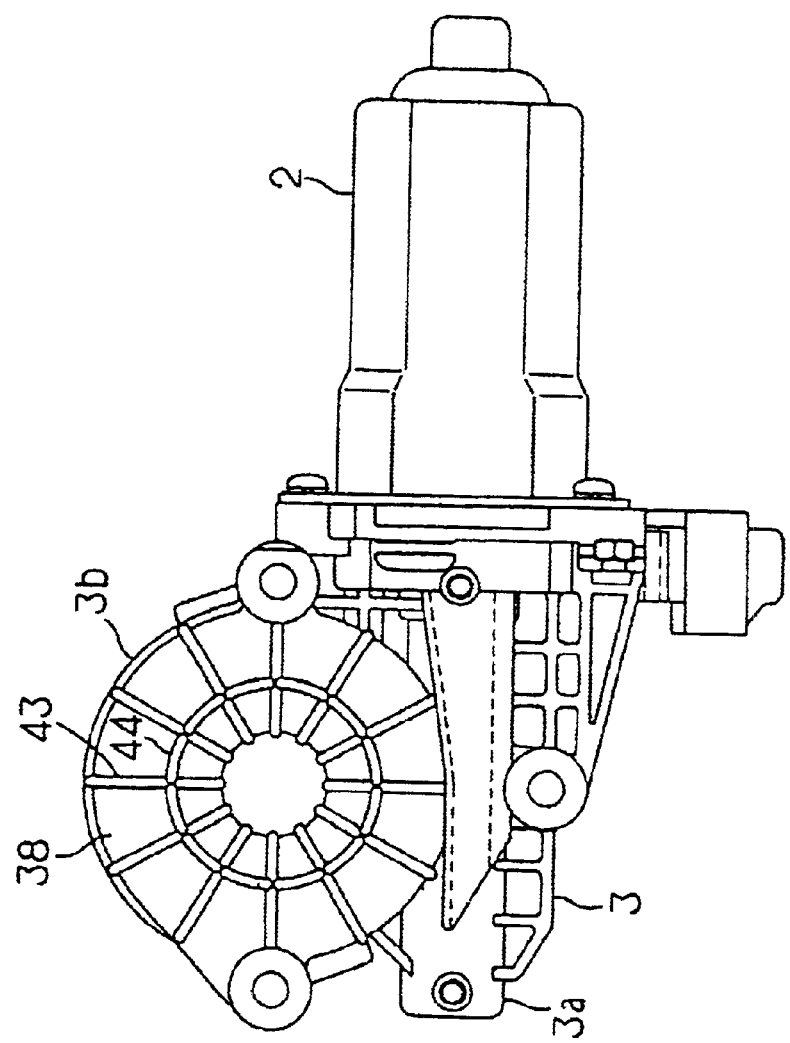
FIG. 5 is a schematic plan view showing the ribs provided on the gear housing of the geared motor shown in FIG. 4.
Figure 7:
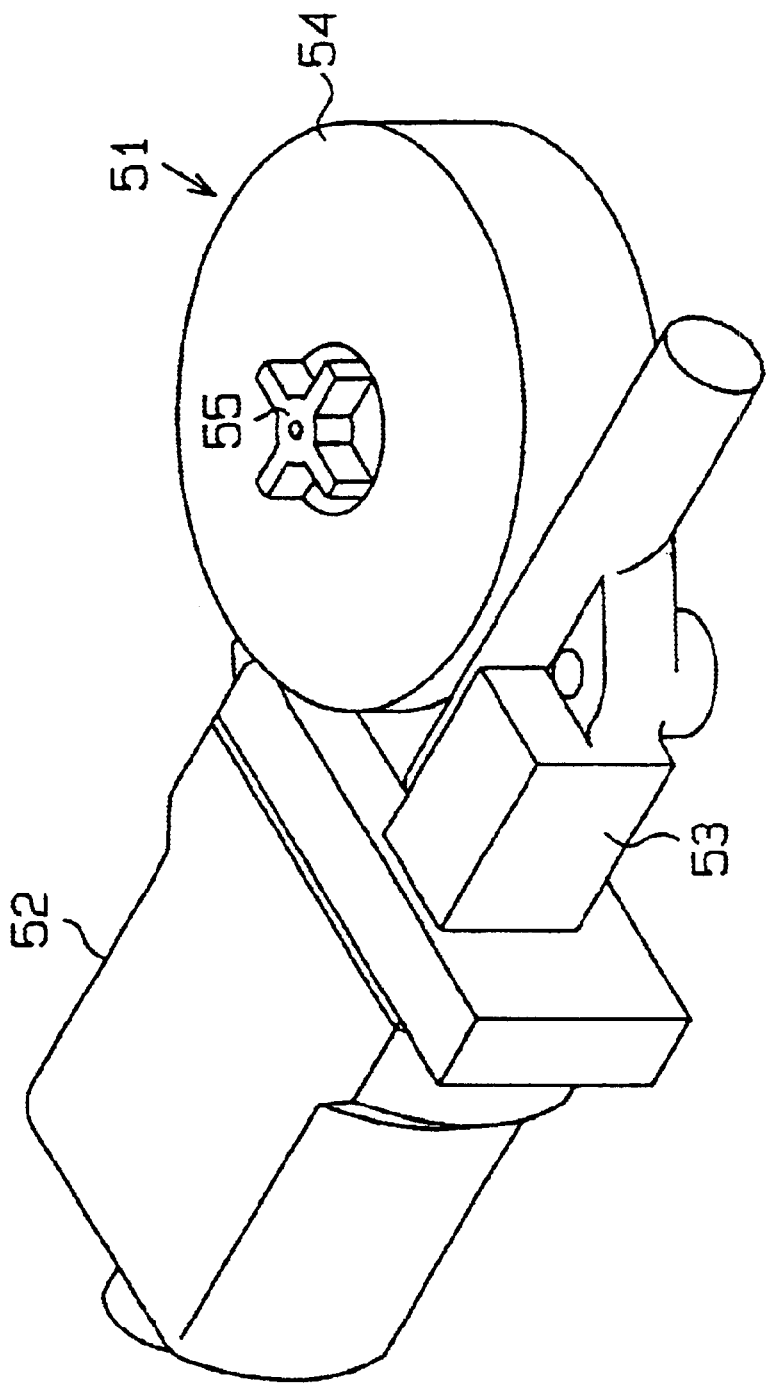
FIG. 7 is a perspective view of a previously proposed geared motor.

In the above embodiment, the ribs 41a and 41b are only arranged along the outer surface of the base wall 38 of the wheel housing segment 3b which extends in the direction perpendicular to the axial direction of the output shaft 27. These ribs 41a and 41b can be modified to any other forms. For instance, as shown in FIG. 4, ribs 43 can extend continuously from at least part of the outer surface of the base wall 38 of the wheel housing segment 3b to at least part of an outer peripheral surface of the peripheral wall 39 of the wheel housing segment 3b. In this way, warping of the wheel housing segment 3b can be further restrained, and a mechanical strength of the gear housing 3 can be further improved. This arrangement is also shown in FIGS. 5 and 6. Furthermore, as shown in FIGS. 5 and 6, in addition to the radially extending ribs 43, a circumferential rib 44 can also be provided in the outer surface of the wheel housing segment 3b. The circumferential rib 44 extends substantially about the output shaft 27 in a circumferential direction and connects the radially extending ribs 43. The circumferential rib 44 has a radial thickness that is measured in a radial direction of the base wall 38 of the wheel housing segment 3b and that is equal to or smaller than the axial thickness T2 of the base wall 38 of the wheel housing segment 3b. The circumferential rib 44 provides further resistance against warping of the wheel housing segment 3b and also can reinforce the mechanical strength of the wheel housing segment 3b. The circumferential rib 44 can also be added to the arrangement shown in FIGS. 1 to 3 to connect the ribs 41a and 41b in the outer surface of the base wall 38 of the wheel housing segment 3b. Furthermore, although only one circumferential rib 44 is shown in FIG. 5, more than one circumferential rib 44 can be provided, as desired.

In the above embodiment, the invention is described in connection with the geared motor 1 that is used as the driving source of the vehicle power window system. However, the present invention can be applied to any other geared motor used as a driving source of any other vehicular device or of any non-vehicular device.

Additional advantages and modifications will readily occur to those skilled in the art. The invention in its broader terms is therefore, not limited to the specific details, representative apparatus, and illustrative examples shown and described.

What is claimed is:

1. A geared motor comprising:
a yoke having an opening and receiving a motor unit;
a gear housing made of a resin material, said gear housing covering said opening of said yoke and receiving a worm gear assembly for transmitting a rotational force of said motor unit to an output shaft connected to said worn gear assembly, said worm gear assembly including a worm wheel, said gear housing having a wheel housing segment that receives and rotatably supports said worm wheel, said wheel housing segment having a base wall, said output shaft being connected to said worm wheel and being rotatably received in said base wall of said wheel housing segment such that an axial direction of said output shaft is generally perpendicular to a plane of said base wall of said wheel housing segment; and
a plurality of ribs extending over at least part of an outer surface of said base wall of said wheel housing segment, each one of said plurality of ribs having a literal thickness that is measured in a direction perpendicular to said axial direction of said output shaft and that is equal to or smaller than an axial thickness of said base wall of said wheel housing segment measured in said axial direction of said output shaft, wherein:
said worm gear assembly further includes a worm;
said gear housing has a worm housing segment that rotatably receives said worm, and the worm housing segment is located radially outward of the wheel housing segment; and
at least two of said plurality of ribs continuously extend radially to said worm housing segment beyond said base wall of said wheel housing segment.

2. A geared motor according to claim 1, wherein:
said wheel housing segment further includes a peripheral wall that generally extends from an outer peripheral edge of said base wall of said wheel housing segment in said axial direction of said output shaft; and
at least one of said plurality of ribs further extends in said axial direction of said output shaft over at least part of an outer peripheral surface of said peripheral wall of said wheel housing segment.

3. A geared motor according to claim 1, wherein:
said wheel housing segment further includes a shaft supporting portion for rotatably supporting said output shaft;

said shaft supporting portion is located generally at a center of said base wall of said wheel housing segment; and said each one of said plurality of ribs extends radially outwardly from said shaft supporting portion.

4. A geared motor according to claim 3, wherein said each one of said plurality of ribs has an axial thickness that is measured in said axial direction of said output shaft and that decreases from said shaft supporting portion toward said outer peripheral edge of said base wall of said wheel housing segment.

5. A geared motor according to claim 1, wherein said plurality of ribs are arranged at substantially equal intervals.

6. A geared motor according to claim 1, wherein said plurality of ribs are circumferentially arranged at substantially equal angular intervals.

7. A geared motor according to claim 1, further including a circumferential rib that extends about said output shaft in a circumferential direction in said outer surface of said base wall of said wheel housing segment, said circumferential rib having a radial thickness that is measured in a radial direction of said base wall of said wheel housing segment and that is equal to or smaller than said axial thickness of said base wall of said wheel housing segment.

8. A geared motor according to claim 1, wherein aid at least two of said plurality of ribs extend substantially to an imaginary plane, the imaginary plane extending through a rotational axis of maid worm and being parallel with a rotational axis of said worm wheel.

9. A geared motor according to claim 1, wherein:

said gear hewing includes at least two securing portions for securing said gear motor; and at least one of said plurality of ribs is positioned between corresponding two of said at least two securing portions.

10. A geared motor according to claim 9, wherein said at least two securing portions are for directly or indirectly securing said gear motor to a vehicle door.

11. The geared motor hawing according to claim 1, wherein:

the worm is meshed with the worm wheel; and the rotational axis of the worm wheel is generally perpendicular to the rotational axis of the worm.

12. A geared motor housing comprising:

a yoke for housing a motor unit and including an opening;

a resin gear housing covering said opening of said yoke and for housing a worm gear assembly, said resin gear housing having a wheel housing segment for rotatably supporting a worm wheel, said wheel housing segment having a base wall for rotatably receiving an output shaft connected to said worm wheel such that an axial direction of said output shaft is generally perpendicular to a plane of said base wall, said resin gear housing further including a worm housing segment for rotatably receiving a worm gear assembly worm, wherein the worm housing segment is located radially outward of the wheel housing segment; and a plurality of ribs each extending over at least part of an outer surface of said base wall, at least two of said plurality of ribs continuously extending radially to said worm housing segment beyond said base wall.

13. The geared motor housing of claim 12, wherein each of said plurality of ribs has a lateral thickness relative to a direction perpendicular to said axial direction of said output shaft that is equal to or smaller than an axial thickness of said base wall relative to said axial direction of said output shaft.

14. The geared motor housing of claim 12, wherein:

said wheel housing segment further includes a peripheral wall that generally extends from an outer peripheral edge of aid base wall of said wheel housing segment in said axial direction of said output shaft; and at least one of said plurality of ribs thither extends in said axial direction of said output shaft over at least put of an outer peripheral surface of said peripheral wall of said wheel housing segment.

15. A geared motor housing according to claim 12, wherein:

said gear housing includes at least two securing portions for securing said gear motor; and at least one of said plurality of ribs is positioned between corresponding two of said at least two securing portions.

16. The geared motor housing according to claim 12, wherein:

the worm is meshed with the worm wheel; and the wheel housing segment and the worm housing segment are arranged to receive the worm wheel and the worm gear assembly worm, respectively, in a manner such that the rotational axis of the worm wheel is generally perpendicular to the rotational axis of the worm gear assembly worm.

17. A geared motor housing comprising:

a yoke for housing a motor unit and including an opening;

a resin gear housing covering said opening of said yoke and for housing a worm gear assembly, said resin gear housing having a wheel housing segment for rotatably supporting a worm wheel, said wheel housing segment having a base wall for rotatably receiving an output shaft connected to said warm wheel such that an axial direction of said output shaft is generally perpendicular to a plane of said base wall, said resin gear housing further including a worm housing segment for rotatably receiving a worm gear assembly worm; and a plurality of ribs each extending over at least part of an outer surface of said base wall, at least two of said plurality of ribs continuously extending radially to aid worm housing segment beyond said base wall, wherein:

said wheel housing segment further includes peripheral wall that generally extends from an outer peripheral edge of said base wall of said wheel housing segment in said axial direction of said output shaft; and at least one of said plurality of ribs further extends in said axial direction of said output shaft over at least part of an outer peripheral surface of said peripheral wall of said wheel housing segment.

* * * * *